Nov. 25, 1952  E. H. GREIBACH  2,619,576
SOLDERING IRON
Filed Jan. 3, 1949  3 Sheets-Sheet 1
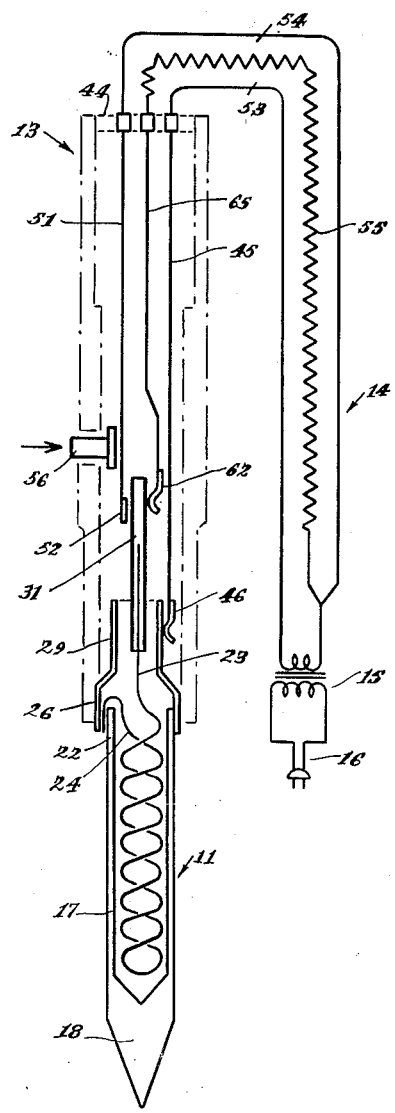
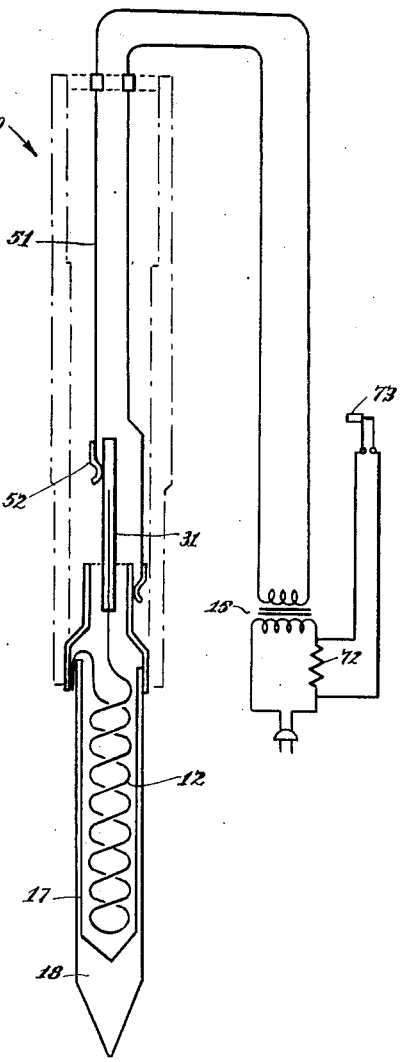
INVENTOR.
E. H. GREIBACH
BY Nov. 25, 1952      E. H. GREIBACH      2,619,576
SOLDERING IRON
Filed Jan. 3, 1949      3 Sheets-Sheet 2
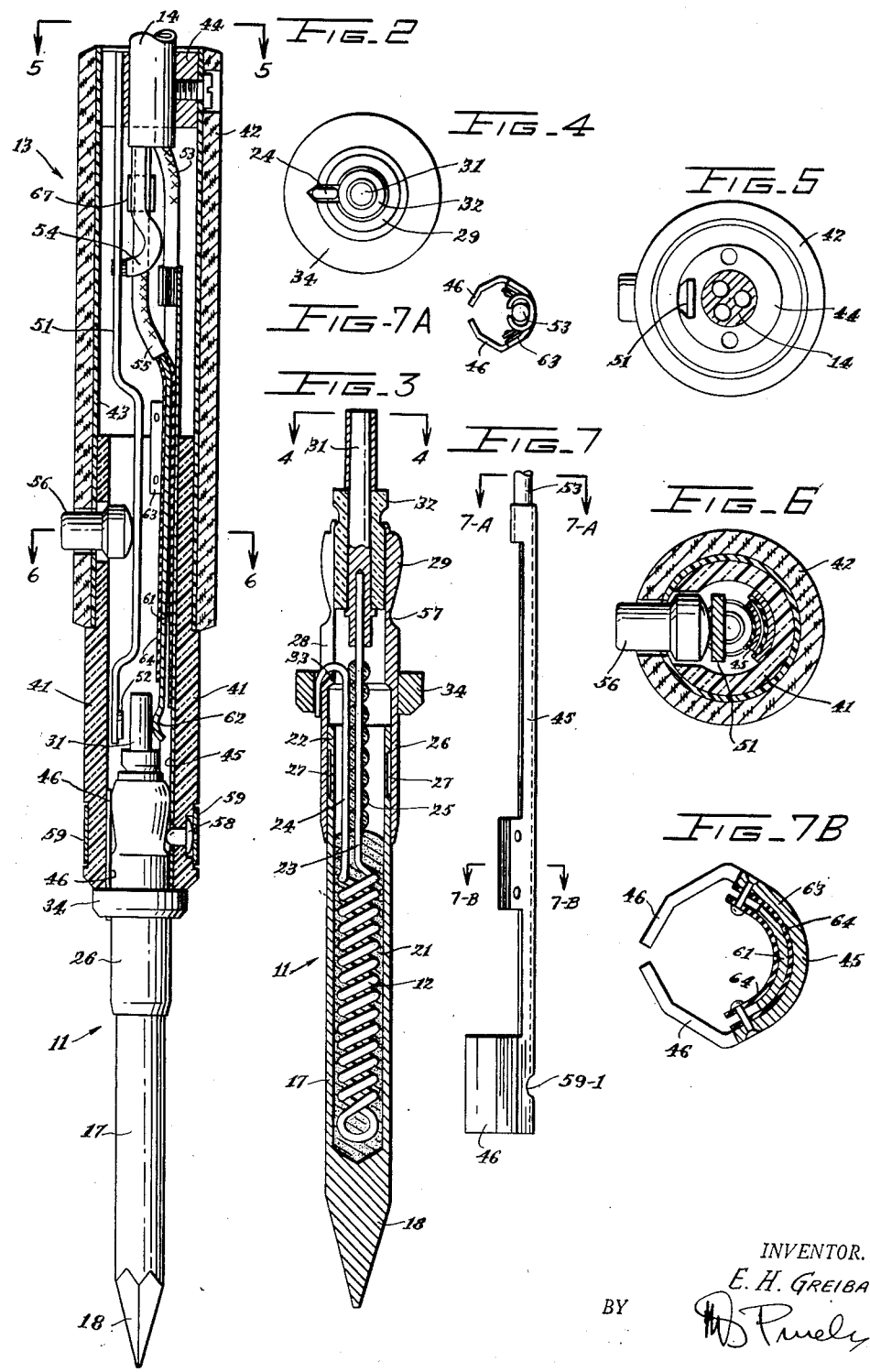
INVENTOR.
E. H. GREIBACH
BY

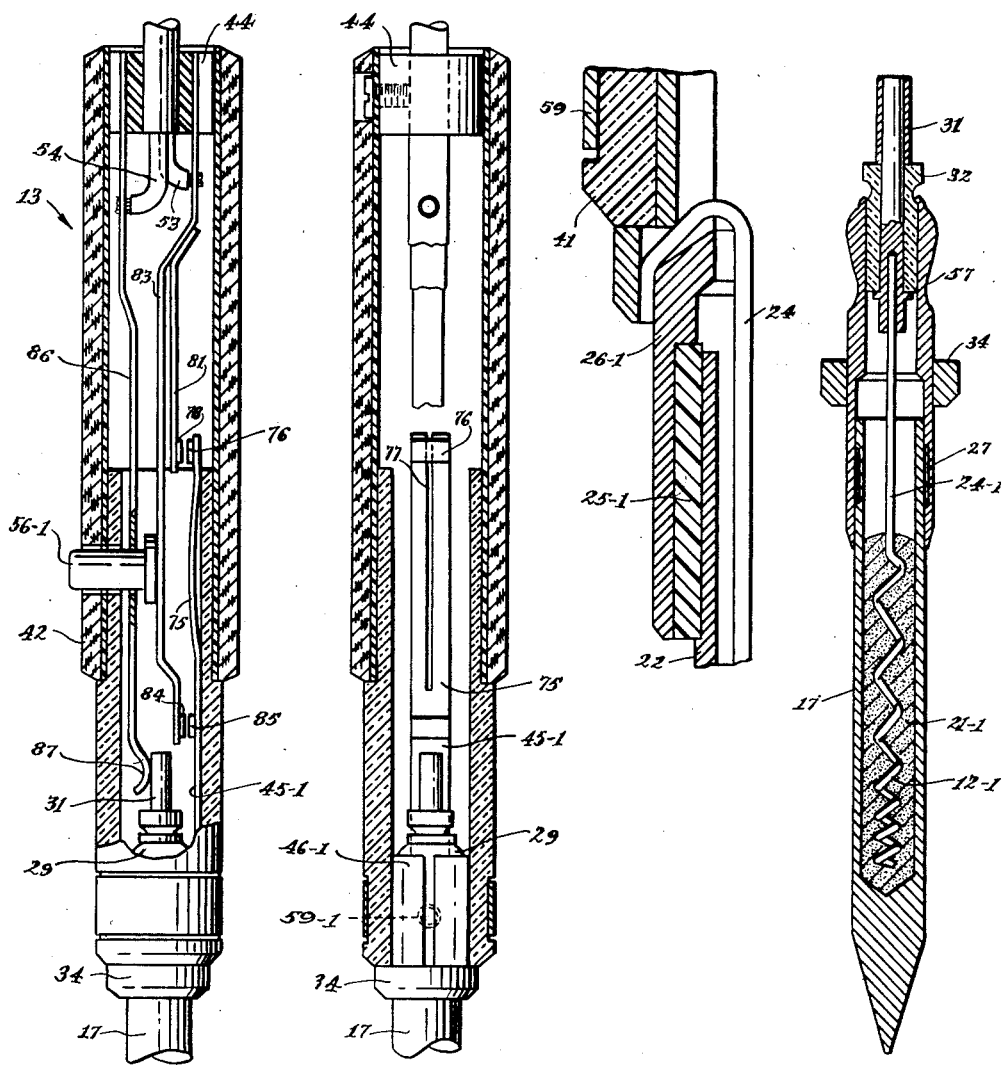

Patented Nov. 25, 1952

2,619,576

UNITED STATES PATENT OFFICE 2,619,576

SOLDERING IRON

Emil H. Greibach, New Rochelle, N. Y.

Application January 3, 1949, Serial No. 68,842

13 Claims. (Cl. 219—26)

This invention relates to soldering irons, and more particularly to electrically energized soldering irons.

Among the objects of the invention is a novel electrically energizable soldering iron in which the soldering tip constitutes the electrical heating unit of the soldering iron and forms a self-contained soldering head unit arranged for detachable mechanical and electrical interconnection with a handle through which electric energy is supplied to the soldering head.

The foregoing and other objects of the invention will be best understood from the accompanying description of exemplifications thereof, reference being had to the accompanying drawings, wherein:

Fig. 1 is a diagrammatic view of one form of the soldering iron of the invention and its operating electrically energizing system;

Fig. 1-A is a view similar to Fig. 1, of a modified form of an electric soldering iron and cooperating energizing system exemplifying the invention;

Fig. 2 is a vertical cross-sectional view of one practical form of the soldering iron of the invention;

Fig. 3 is an enlarged cross-sectional view, similar to Fig. 2, of the soldering head of the soldering iron shown in Fig. 2;

Fig. 4 is a cross-sectional view along line 4—4 of Fig. 3;

Fig. 5 is a cross-sectional view along the lines 5—5 of Fig. 2;

Fig. 6 is a cross-sectional view along line 6—6 of Fig. 2;

Fig. 7 is an elevational view of the contact member of the handle of the soldering iron of Figs. 1 to 6, inclusive;

Fig. 7-A is a view along lines 7-A—7-A of Fig. 7; and

Fig. 7-B is a view along lines 7-B—7-B of Fig. 7.

Fig. 8 is an enlarged cross-sectional detailed view of a portion of a soldering head similar to Fig. 3, showing a modification thereof;

Fig. 9 is a cross-sectional view similar to Fig. 2 of modified form of handle for soldering iron of the invention;

Fig. 10 is a cross-sectional view at right angles to Fig. 9 of the same handle; and Fig. 11 is a vertical sectional view similar to Fig. 3 of another soldering head exemplifying the invention.

Referring to Figs. 1 to 7, inclusive, there is shown one form of electrically energized soldering iron exemplifying the invention, comprising a soldering head generally designated 11 with an electrically energized heating element 12 constituting a self-supporting unit arranged for detachable interconnection with a separate handle generally designated 13, and arranged to be energized by means of a cord of conductor leads 14 extending from the handle to a step-down transformer 15 the primary supply winding of which is connected through a two-conductor cord 16 having a conventional plug connected to a standard electric power supply circuit, such as a 110 volt, 60 cycle supply line.

As shown in Figs. 2, 3 and 4, the soldering head 11 comprises an elongated soldering tip 17 in the form of a hollow tubular shank having a pointed tip end 18. The hollow space of the tip-shank 17 is filled with the electrical heating element 12 of wire embedded in a body 21 of electrical insulating material having good heat conductivity, which is fused to the wire turns and also to the inner surface of the hollow solder tip 17 so that the soldering tip 17 constitutes in effect a solid body of high heat conducttivity, a part of which is formed of the electric heating wire or in general of electric heating resistance elements.

To assure most efficient operating conditions, it is desirable that the tip of a soldering iron be raised to proper soldering temperature within the shortest possible time, while assuring that heat is supplied to the soldering tip only as long as soldering operations are carried on and heat is absorbed from the tip of the soldering iron. It is further desirable that most of the volume of the soldering tip of the soldering electrically heated soldering iron should be utilized as the electrical resistance material which supplies to the tip the required electric heating energy. In order to generate in the solder tip a given amount of electric energy within a given time, a certain volume of heating wire is required. For a given supply voltage, a certain length and cross-sectional area of heating wire is required to generate a given amount of heat energy. As the supply voltage decreases, the length of the wire has to be decreased and the area of the wire increased at the same rate to provide for the generation of the same amount of heat energy. However, for such decrease of voltage, the diameter or width of the wire increases only proportionately to the square root of the decrease of its length, and as a result the exposed surface of the heater wire increases only proportionately to the square root of the decreased wire length. Thus, if the wire length is decreased to onefourth, the area of the wire required for dissipating the same amount of energy increases only one-half. This is of advantage because the smaller the exposed surface of the heating wire, the less it is subject to evaporation and oxidation incident to heating to the high temperature required to assure rapid heating of the soldering tip.

By making the heater wire short and of correspondingly large cross-section, there is less likelihood for developing therein hot spots which are caused by non-uniformities of the cross-section and the material of the heater wire. Such hot spots are, as a rule, the cause of burning out of the heater wire.

In a soldering iron of the invention of the type described above, the heat is developed within the soldering tip itself immediately adjacent to the pointed end of the solder tip which is applied to the object being soldered. The body of the solder tip 17 is made of highly heat-conductive metal and has a long and slender shape, a feature important for reaching inaccessible solder joints while securing instantaneous heating of the solder tip whenever desired. The soldering tip is of highly heat-conductive material so that most of the generated heat flows toward the pointed end 18, the rear parts of the soldering head 11 being made of material having low heat conductivity so as to impede the flow of heat from the soldering tip to the handle 13.

To secure rapid generation of heat within the slender soldering tip 17, the heating wire 12 is made of relatively short length and relatively large cross-section, and it is supplied with a relatively large current at reduced voltage.

With no intention of in any way limiting the scope of the invention, and in order to facilitate ready practice thereof, there are given below data of one practical form of soldering iron based on the principles of the invention.

The soldering tip 17 is made from any commercially available copper alloy which does not fuse with tin. Alternatively, the solder tip may be made of copper, the exterior of which is plated with a layer of nickel which does not fuse with tin. The tip 18 was of circular cross-section, $\frac{5}{16}$" in diameter and 2" long. The heater wire 12 is made of a commercially available alloy of chromium, iron, aluminum and cobalt having a relatively high electric resistance and which will stand for a substantial time a temperature in the range between 1100° C. to 1400° C. and which may be maintained continuously at a temperature of 1100° C. without causing it to soften and fuse. The heater element 12 is formed by reversely bending a length of the heater wire and winding the reversely bent wire loop into a double or bifilary, helically-wound spiral, each turn of which consists of two spaced wire elements. The heater wire is .045" in width and has a length which dissipates 150 watts heat energy when energized from an 8 volt 60 cycle power line. The electrically-insulating, heat-conducting body 21, in which the heater wire 12 is embedded, is made of commercially available electrically-insulating magnesium oxide cement which fuses and forms a good continuous heat conducting connection between the metallic body of the heater wire 12 and the metallic body of the solder-tip 17. The heater wire 12 fills about 40% of the volume occupied by it and the insulating cement 21 for a circular wire cross-section, and about 50% of the volume for a rectangular wire cross-section.

When the heater element is supplied with about 18 ampere current at a voltage drop of about 8 volts across it, the solder tip will be raised within about twelve to fifteen seconds from the low normal room temperature to the temperature sufficient to melt solder-tin composition, or about 380° C.

The self-supporting soldering head 11 described above is designed for detachable mechanical and electrical coupling with the handle 13. To this end, the rear end of the soldering head 11 is provided with a coupling sleeve member 26. The sleeve-like coupling member 26, made of a metal such as stainless steel having a relatively low heat conductivity compared to the material of the soldering tip 17, is held affixed in its seat, as by a press fit, over the open rear end 22 of the soldering tip 17. To decrease the heat conductivity between the rear portion 22 of the solder tip and the coupling sleeve 26, the major part of the rear end 22 of the solder tip, which is seated within the coupling sleeve 26, is made of a somewhat reduced diameter to provide a hollow air space 27 impeding the flow of heat from the soldering tip 18 toward the coupling sleeve 26. Alternatively, as shown in Fig. 8, a tubular heat-insulating member 25—1 of ceramic material or ceramic cement may be interposed between the overlapping surface of the rear end of the soldering tip 17 and the coupling sleeve 26—1 seated thereover.

The hollow rear end 22 of the soldering tip 17 is not filled with cement but left free therefrom to reduce its heat conductivity. The two wire ends 23, 24 of the heater wire 12, extending through the hollow rear end of the tip 17, are insulated from each other by placing on the wire end 23 a plurality of insulating beads 25 of an electrical insulating and heat-resisting material, such as a ceramic composition. Within the open rear end portion 29 of the coupling sleeve is insulatingly supported a central rod-like terminal member 31 of conducting material, such as copper, secured to the free end portion 23 of the heater wire. To prevent corrosion of the exposed central terminal rod 31 of the soldering head 11, a sleeve of non-corrosive, highly conducting metal, such as silver, is affixed thereover. An insulating sleeve 32 of electrical and heat insulating material, such as ceramic material, serves as an insulating support which supports the terminal rod 31 within the open end 29 of the coupling sleeve 26. The outer end wire 24 of the heating element is electrically and mechanically secured to the metallic coupling sleeve 26 which serves as the other terminal connection to the heater wire 12. To provide a good and positive mechanical and electrical connection to the heater wire end 24, the rear portion of the coupling sleeve 22 is provided with an axial slit 28 and the wire end 24 is folded over and secured to the edge portion 33 of the coupling sleeve bordering the slit 28. As shown, a flange ring 34 which is forced and jammed over the exterior of the coupling sleeve over which the end portion 24 of the heater wire is folded, serves to secure a good electrical and mechanical connection between the heater wire end 24 and the metallic coupling sleeve 26. The handle 13 is made in the form of a rigid hollow structure of electrical and heat-insulating material. It has a hollow forward handle section 41, shown made of a rigid tube member of heat-insulating ceramic. The rear handle section 42 of the handle is made of a highly heat-insulating material, such as a cork composition, adheringly united to the exterior of a relatively thin cylindrical tubing core 43, which may be made of resin-impregnated paper base material so as to form with the exterior cork body a rigid heat and electrical insulating handle part which will serve as a good grip for the soldering iron.

The heat and electrically insulating sleeve 32 is shown retained within the open rear coupling end 29 of the coupling sleeve by crimping a thin cylindrical end portion of the coupling sleeve end 29 over the edge of an annular groove or recess provided in the end portion of the insulating sleeve 32.

As indicated in Fig. 2, the forward handle section 41 has a rear part of slightly reduced diameter over which the front end of the rear handle section 42 is forced and united thereto as by a cement, so that the two handle sections 41, 42 constitute a substantially rigid, hollow, generally cylindrical handle structure 13 of electrical and heat insulating material, which impedes the flow of heat from the front to the rear handle section which serves as the grip for the soldering iron.

Within the hollow rear end of the handle structure 13 is mounted a closure plug 44 which serves as a support and insulating junction for two main elongated contact members 45 and 51 projecting therethrough into the forward region of the hollow interior space of the handle structure 13. Contact member 45, shown in detail in Figs. 7-A and 7-B, is made by an elongated strip of electrical conducting spring metal, such as a beryllium copper alloy which remains elastic even if heated to relatively high temperatures. The rear end of the contact strip 45 has two ears which are bent over the wire strands of a flexible electric conductor lead 53 from which the covering insulation has been stripped and which provides an insulated electrical supply connection to the contact member 45. The forward end of the contact member 45 has two spring contact jaws 43 bent to fit into and be retained in position within the circular open forward end of the handle 13 for establishing electrical contact engagement with the exterior circular contact surface of the coupling and contact end 29 of the soldering head 11. This arrangement of the generally tubular contact jaws 46 assures that when the contact end portion 29 of the coupling sleeve 26 of the soldering head 11 is inserted within the open forward end of the handle, the contact jaws 46 of the contact member 43 will be elastically deformed in outward direction and exert compressing forces which maintain a good electrical contact connection with the coupling sleeve 26, and therethrough a good electrical conducting connection to the wire end 24 of the heater wire 12.

The other contact member 51 is similarly made of an electrically highly conductive spring material, such as beryllium copper alloy, and has at its front end a contact portion 52 serving to establish an energizing connection with the central terminal rod 31 of the soldering head 11. The contact portion 52 may be made of a non-corrosive electrically highly conductive metal such as silver, and is arranged so that by applying an external force against an intermediate portion of the contact arm 51, the contact end 52 thereof will establish a good electrical contact connection with the central terminal member 31 of the heater wire 12 of the soldering head 11. To a rear portion of the contact arm 51 are electrically and mechanically joined the electrical conductor ends of another supply lead 54 of the supply cord 14 connected to the handle.

The closure plug 44 which is retained, as by a screw pin, in the open rear end portion of the hollow handle member 13, is provided with a central hole through which the several insulated leads 54, 53 of the electric cord 14 are brought into the hollow interior of the handle 13 where the electric wire conductors of the cord leads 54, 53 are joined, as by soldering and clamping, to the contact members 45 and 51, respectively. This arrangement makes it possible to retain the cord by a suitable strain take-up element such as a few turns of cord wound over the interior insulated ends of the cord leads, or other strain reliefs.

Means are also provided for retaining contact jaw portions 46 of the contact member 45 in the operative contact coupling position along the interior cylindrical surface of the open coupling end of the handle 13. In the arrangement shown, the head-locking pin 58 is utilized to keep the coupling jaw portion 46 of the contact member 45 in its position shown. To this end, the intermediate part of the contact jaw portion 46 of the contact member 45 is provided with a circular hole 59—1 (Fig. 7) which is at all times engaged by the head-locking pin 58 when it is held by its biasing spring 59 either in its inward locking position shown in Fig. 2 or when the locking pin 58 is laterally displaced in locking position to which it is moved on the coupling end portion 29 of the coupling sleeve 26 in the procedure of uncoupling or coupling the soldering head 11 to the handle 13.

In the form shown in Figs. 1 to 5, an externally exposed, manually actuable button member 56, which is slidably retained within a radial guide opening of the handle section 42, has a slightly enlarged inner head engaging an intermediate portion of the spring contact arm 51. The botton 56 is so arranged that its inward motion deflects the contact arm and its contact 52 into contact engagement with the central terminal 31 of the soldering head 11, the elastic forces of the spring contact member 51 returning it to its open position, in which it is shown in Fig. 2, whenever the button 56 is released.

The cooperating overlapping portions of the coupling end 29 of soldering head 11 and of the handle 13 are provided with means for releasably locking the soldering head and retaining it in its inward mechanically and electrically coupled position within the forward part of the handle. In the form shown in Figs. 2, 3 and 4, the coupling sleeve end 29 of the soldering head 11 has an annular recessed portion or interlocking groove 57 arranged for interlocking engagement with a locking button 58 slidably positioned in a radially extending circular hole of the handle member 41. The locking button 58 is held biased by elastic biasing means to the inward locking position in which it engages the interlocking groove 57 of the coupling end portion of the soldering head, as shown in Fig. 2, and resists withdrawal of the soldering head from the handle. The locking button 58 is biased to the inward locking position by the biasing means which are shown in the form of a split spring ring 59 made from spring sheet metal and fitting within an annular recess of the cylindrical outer surface of the handle member 41. The spring ring is provided with a little hole for seating therein a retainer pin projecting from the wider enlarged outward end of the locking button 58.

As shown in Figs. 2 and 3, the outer surface of the coupling end portion 29 of the soldering-head coupling sleeve 26 has an outwardly bulging, generally circular cam surface tapering inwardly from an intermediate region of greater diameter to the narrower regions of the locking groove 57 and the rear end of the coupling sleeve. By providing the coupling end portion 29 of the soldering head 11 with two inwardly tapering regions, leading to the interlocking groove 57 and to the end of the coupling sleeve, the locking button 58 which serves to retain the soldering head in its electrically and mechanically coupled operative position within the handle, is forced to an outward unlocking position whenever the soldering head 11 is inserted with a limited force into its coupled position within the handle 13, or removed therefrom, while assuring that the soldering head is positively retained within the forward end of the handle under normal conditions of use.

In the soldering iron of the invention combining the elements described thus far above, the heater element 12 of the soldering iron remains normally de-energized and is energized only whenever the contact operating button 56 is manually actuated or pressed, thereby deflecting the contact member 52 from the normally restrained open position to an inward circuit-closing position in which it makes contact with the central heater terminal 31 of the soldering head and energizes the same.

With such soldering iron of the invention, of the specifications set forth above, the solder tip will be brought from the relatively low room temperature to the desired soldering temperature of molten solder, such as 380° C. to 390° C., within about twelve to fifteen seconds after closure of the contact 52. As a result, actuation of the contactor button 56 brings the soldering tip 17 of the soldering iron of the invention quickly to the desired high soldering temperature whenever a soldering operation is to be performed, and upon release of the contactor button 56 is de-energized, and the soldering tip 17 is returned to a lower temperature at which the solder remains solid and the metal of the solder tip does not deteriorate.

In accordance with one phase of the invention, a soldering iron of the invention of the type described above is combined with means for normally supplying to the soldering tip a reduced stand-by heating current which keeps it preheated, throughout the prolonged period of time in which it is to be intermittently used, to a raised stand-up temperature in the range such as between 200° C. to 225° C., making it possible to raise it to the higher soldering temperature in the range such as 380° C. to 390° C. within a very short instant, such as three seconds, by pressing the contactor actuating button 56 whenever a solder operation is to be performed.

Figs. 1, 2, 6, 7, 7-A, 7-B show one arrangement whereby a soldering iron of the invention of the type described above, may be combined with an auxiliary partial-power energizing circuit which maintains the soldering tip heated to a stand-by raised temperature and which is brought up to the full soldering temperature substantially instantaneously by the completion of the full-power energizing circuit. In the arrangement shown, the fixed elongated contact member 45 has insulatingly mounted on the inwardly facing side an additional auxiliary contact member 61 of a highly conducting spring sheet metal, such as beryllium copper alloy. The auxiliary contact member 61 has at its free end a contact portion 62 resiliently held in a position where it automatically establishes good contact engagement with the central heater electrode 31 of the soldering head 11 whenever it is inserted into its coupled position within the coupling end of the handle 13, as seen in Fig. 2. A rear portion of the spring contact member 61 is held clamped as by rivets to two wing extensions 63 of the fixed contact member 45, insulating spacers 64 serving to keep the two contact members 45, 61 insulated at their clamping junction. The auxiliary contact member 61 is provided with a rearwardly extending terminal tail portion which is covered by an insulating coating and is joined to the exposed end of an additional electric resistance-conductor lead 55 of the cable 14 extending from the transformer 15 and terminating just beyond the inner side of the closure plug 44 of the handle 13. The electric junction between the additional resistance conductor lead 55 of the cord 14 and the tail terminal portion of the auxiliary contactor 61 is enclosed with a suitable insulating enclosure 67, such as a sleeve of insulating material.

In accordance with another phase of the invention, a soldering iron of the invention of the general type described above is combined with a switch-controlled resistance element connected in series with the primary winding of the supply transformer and arranged to keep the soldering tip preheated to an elevated stand-by temperature throughout the prolonged period of time during which it is to be intermittently used, the control switch being actuated to short-circuit the resistance element and supply full heating power to the soldering tip for bringing it substantially instantaneously to its high soldering temperature level whenever soldering operations are to be performed.

Fig. 1-A shows one form of such an arrangement. It comprises a soldering iron and supply circuit generally similar to that of Fig. 1, but without the additional contact member 61 of the handle and without the resistance conductor lead 55 of the supply cord 14. In addition, as indicated in Fig. 1-A, the contact member 51 is arranged to remain continuously electrically connected to the associated terminal member 31 of the soldering head, so as to keep the electric heating element of the soldering tip 17 continuously supplied by an electric energy delivered through the secondary step-down winding of the transformer 15.

The primary winding of the transformer 15 has connected in series therewith a current-limiting voltage-reducing resistance 72 for reducing the electric power supplied to the heating element 12 to a stand-by lower power level at which the soldering tip will be maintained during the prolonged stand-by period of intermittent use at a raised stand-by temperature such as 200° C. to 230° C. but below the full-power soldering temperature of over 300° C. A control means such as a manual, or remotely operated switch 73 is connected across the current limiting resistance 72 so that whenever the control switch 73 is closed, the current limiting resistor 72 will be cut out and cause transformer 15 to supply to the heating element of the soldering tip 17 the full heating power and raise it substantially instantaneously to the full-power soldering temperature of over 300° C.

With the stand-by heat control arrangements of the invention described above in connection with Fig. 1 or Fig. 1-A, the tip of the soldering iron may be maintained throughout a continuous period of intermittent use at a raised stand-by temperature which is below its full soldering temperature, so as to prevent excessive heating of the soldering tip and excessive rise of its temperature while assuring that whenever the soldering tip is to be used for performing a soldering operation, the power may be brought up substantially instantaneously to the full soldering temperature of over 300° C. by the simple actuation of the control button associated with the switch forming part of the soldering handle or connected in the primary winding of the supply transformer.

According to a further phase of the invention, a soldering iron of the invention of the general type described above in connection with Figs. 1, and 2 to 7, inclusive, is combined with a temperature-responsive contactor element forming a part of the handle, which is maintained in heat-conductive engagement with a relatively large-surface metallic coupling element of the soldering head, and which is arranged to automatically close and open the energizing circuit to the heater element of the soldering tip throughout a prolonged stand-by period of time of intermittent use, so that by intermittent energization of the heater element, the soldering tip should be maintained at a raised stand-by temperature such as 250° C., at which the solder tin composition remains solid and the copper alloy of the soldering tip does not deteriorate—thus enabling the soldering iron to be substantially instantaneously raised to the full solder temperature of melting solder whenever a control switch associated with said iron is actuated to provide a shunt connection by-passing the switch contacts controlled by the thermally-responsive contact element.

Figs. 9 and 10 show how the handle part, generally designated 13, of a soldering iron generally similar to that described in connection with Figs. 1 to 7, may be combined with a thermally-responsive contactor switch element operating in accordance with the invention. In the open coupling end portion of the handle there are retained the coupling jaw portions 46—1 of a contact member 45—1 serving to automatically establish an electrical and mechanical contact connection with the metallic coupling end 29 of the coupling sleeve of the soldering head, and which also serves as one electric terminal connection to the heater element embedded in the soldering tip 17.

As in the handle of the soldering iron shown in Figs. 1 to 7, the contact member 45—1 is retained by the interlocking engagement of an opening 59—1 in the jaw portion 46—1 thereof with the locking pin 59 which locks the coupling end 29 of the soldering head in its coupled operative position within the handle.

The contactor member 45—1 with the spring jaw contact portions 46—1 is made of a bi-metallic sheet material which, in response to a rise in temperature, tends to deform in such manner that the contact jaws 46—1 tend to tighten and reduce the cross-sectional area of the tubular formation formed by them, thereby increasing the contact pressure with which they maintain electric contact with the coupling terminal portion 29 of the soldering iron.

As shown in Figs. 9 and 10, the coupling contact member 45—1 has a rearward bi-metallic, striplike movable contact arm 75 provided at its rearward end with a contact element 76 secured thereto, and arranged to close and open a circuit contact connection with a facing cooperating contact portion 78 of a contactor arm 81 suitably held in the cooperative position shown, as by securing its rear end to the end closure plug 44 of the handle 13. The bi-metallic contact arm portion 75 of the coupling contact member 45—1 is shown provided with a longitudinal slit 77, and its end contact portion 76 is secured as by welding to the split ends of the contact strip arm 75, so as to maintain the two split sections of the bi-metallic contact arm 75 deformed in slightly dished shape and in the outward position shown when it is at a desired higher control temperature, or cause it to snap over to an oppositely dished inwardly deflected position when it is at a predetermined lower control temperature, in which inwardly deformed condition its contact 76 completes the circuit contact connection with the contact element 78 of the contactor arm 81 of the handle structure, and vice versa.

The contactor arm 81 which cooperates with the bi-metallic contact arm 75, is part of a contactor member 83, the end of which is suitably affixed in the electrically insulating end closure plug 44 of the handle. The rear portion of the contactor member 81 which cooperates with the bi-metallic contact arm 75, is shown secured as by welding to the rearward portion of the contact arm 83 extending from the closure plug 44 of the handle, which is also shown electrically connected to the conductor of the cord leads 53 leading to the handle from the supply transformer, in the manner explained in connection with the corresponding elements of the soldering iron of Fig. 1.

The contact arm 83 is made of electrically conductive spring sheet material such as beryllium copper, and carries at its forward end a contact portion 84 arranged to establish a circuit-closing contact connection with a contact portion 85 provided on the facing portion of the rearward contactor extension 45—1.

The contact arm 83 is normally biased to maintain its contact portion 84 in the circuit-opening position shown in Fig. 9, and is arranged to be actuated from the restrained open position to a circuit-closing position when a contact button 56—1 slidably mounted in an opening of the handle wall section 42 is actuated, as by a finger, to the inward position, in a manner analogous to the operation of the corresponding elements of the soldering iron described in connection with Figs. 1 to 7.

An additional contact arm of electrically conductive spring metal such as beryllium copper, having its rear end insulatingly held by the closure plug 44 of the handle, has at its forward end a contact portion 87 shaped to automatically establish a contact engagement with the central heater terminal 31 of the soldering head when the latter is inserted into its coupled position within the open forward coupling end of the handle, as shown in Figs. 9 and 10.

As indicated in Figs. 9 and 10, the contact arm 87 may be provided with a hole through which the outwardly extending portion of the contactor button 56—1 passes. The contactor button 56—1 is made of insulating material, and as shown, has an enlarged inner head portion which is retained between the two separated overlying contact arms 86, 83, which provide circuit connections to the heating element of the soldering head.

As indicated in Fig. 9, the exposed inner core end of the supply lead 54 extending from the transformer to the closure plug 44 of the handle, is connected to the contact arm 86 of the handle, the contact portion 87 of which remains at all times in contact with the central heater terminal 31 of the soldering head when the latter is held in its coupled operating position within the forward end of the handle 13.

A soldering iron of the invention provided with a handle arrangement of the general type described above in connection with Figs. 9 and 10, is designed to operate as follows:

It is assumed that the soldering head 11 is coupled to the handle 13 in the manner indicated in Figs. 9 and 10, and that the supply transformer 15 having its secondary windings connected to the cord leads 53, 54 of the handle is energized. Since the contact jaws 46 from which bimetallic thermostatic snap-contact arm 77 extends is all times in heat-conductive connection with the soldering tip of the soldering head, it will be, at all times, maintained at a temperature corresponding to the temperature of the soldering tip, and it will undergo corresponding changes of temperature. The bimetallic contact strip 77 is so designed that when the temperature of the soldering tip 17 is below the desired stand-by temperature range, such as 200° C. to 215° C., the bimetallic contactor strip 77 will remain in a position in which its contact portion 76 is held deflected into contact engagement with the contact portion 78 of the contactor arm 81, thereby completing an electric energizing circuit to the heating element of the soldering 17 and supplying a heating current thereto sufficient to raise the soldering tip to a stand-by temperature level at which the solder composition remains in a solid state and the copper alloy material of the tip does not deteriorate.

After the heating current supplied to the heating element raises the soldering tip—to a temperature above the desired stand-by level, such as about 215° C. to 245° C.—the dished bimetallic contact strip 75 is raised by heat conduction from the soldering tip 17 to a corresponding higher temperature which causes the bimetallic structure of the contractor strip 75 to deform in an opposite direction until it passes past the neutral position of its dished structure, whereupon it snaps its energy-supplying contact connection with the contact portion 78 of contact arm 81 thereby interrupting the supply of stand-by energy to the heating element of the soldering tip 17. The circuit-opening contacts 76 of the bimetallic contactor strip 77 remain in the open position (in which they are shown) until the loss of heat lowers the temperature of the soldering tip below the desired stand-by level, resulting in a corresponding drop in the temperature of the dished bimetallic contactor strip 77 connected thereto, causing the bimetallic structure thereof to develop internal forces which deflect its dished structure towards the circuit closing position, moving abruptly into it as soon as it passes the neutral position of its dished structure.

As a result, the soldering tip of the soldering iron of the invention will be at all times, maintained at a raised stand-by temperature level below the fusion temperature of solder, but sufficiently high to assure that the soldering tip is substantially instantaneously, or in about two to three seconds, brought to the full soldering temperature of molten solder, whenever actuation of the contactor button 56—1 completes a direct energizing circuit between the contact arm 83 and the cooperating contact portion 85 of the coupling jaw contact member 45—1 of the soldering iron.

According to another phase of the invention, a simplified and more efficient soldering tip for a soldering iron of the invention is provided, by filling a hollow space of a generally elongated metallic soldering tip with a body of electrical resistance heater material, the exterior of which is fused to the interior metallic surface of the hollow soldering tip which is utilized as one terminal connection to the heater body of the tip, the other terminal connection of the heater body being provided by a generally elongated metallic member embedded in the heater body filling the hollow interior of the soldering tip, the contactor member having been provided with an exposed portion serving as the other terminal connection to the heater body of the tip. Fig. 11 shows, in cross-section, one form of soldering head of the general type described in connection with Figs. 1, 2 and 3, provided with such soldering tip of the invention.

The soldering head of the invention shown in Fig. 11 is generally similar to that of Figs. 1, 2 and 3. The interior of the hollow soldering tip 17 is filled with a heater body of a highly heat-conducting composition embodying also electrically-conducting resistance elements which are so distributed therein as to render the heater body of the material filling the hollow space of the solder tip 17 an electrical conductor of relatively high electrical resistance. Such an electrical resistance body may be formed by dispersing in a heat resistant electrically-insulating cement metallic powder particles of a heat-resistant metallic alloy, so that the solidified body of the cementitious material with the metallic powder dispersed therein forms an electrically conducting resistance body.

A commercially available electrically insulating magnesium oxide cement may be utilized as a cementitious material for such electrical resistance body. The electrically conducting powder particles of such cementitious electrical resistor body may be made from commercially available metallic heater alloys, such as metal alloys of chromium, iron, aluminum, cobalt, having a relatively high electrical resistance and which will stand for a substantial time a temperature in the range between 1000° C. and 11,000° C. or 14,000° C., and which may be maintained continuously at a temperature of about 1100° C. without causing deterioration thereof. A mixture body of such cementitious heat-resistance electrically conducting resistance material will readily fuse to the internal metallic surface of the hollow metallic solder tip 17. It will also readily fuse to an elongated metallic terminal member 12—1 embedded within the cementitious body before it is solidified, and serving to pass electrical energy through the resistance body 21—1 filling the soldering tip to the metallic exterior of the solder tip 17 which serves as the other electrical terminal of the heater body.

As indicated in Fig. 11, the terminal member 12—1 of electrically conductive heat resistant alloy similar to that of the heater wire 12 of Figs. 2, 3, may be made in the form of a wire coiled into a spiral and extending throughout the central region of the resistance heater body 21—1 filling the elongated hollow space of the soldering tip 17.

As indicated in Fig. 11, the most inward portions of the coiled embedded terminal member 12—1 from its terminal body have closely spaced turns and provide a larger exposed area in contact with the resistance body than the portions which are nearer the exit end of the terminal wire to assure proper, substantially-uniform distribution of the current flowing across the heater body 21—1 from the center region thereof towards the surrounding terminal surface of the hollow soldering tip 17 surrounding it. Alternatively, a generally-straight inner terminal member with a suitably large exposed area at its inward end and decreasing gradually toward the outer end thereof, may be used in lieu of the coiled wire-like terminal member 12—1. Satisfactory results may also be obtained by using a straight rod as a terminal member embedded and fused within the electrically conducting resistance heater body 20—1.

What I claim is:

1. In a soldering iron: a generally tubular handle composed essentially of electrically-insulating material of relatively low heat conductivity; said handle having a hollow handle-coupling portion at its front end, and an electric supply conductor cord extending from its rear portion; a soldering head having an electrically energizable elongated soldering tip at the front end and constituting a self-supporting unit having at its rear a coupling end arranged for detachable mechanical and electrical coupling and seating engagement within the coupling portion of said handle; said soldering tip comprising a substantially rigid hollow elongated shank having thin walls of heat conductive metal; the forward end of said shank having a solid pointed end portion; the rear part of said shank being provided with one outwardly exposed tubular electrical heater terminal forming a fixed mechanical and electrical part of said tip; the rear part of said tip having also an electrical terminal conductor electrically insulated from and extending through the hollow rear part of said shank and having an outwardly exposed other electrical heater terminal of opposite-polarity projecting from the rear of said tubular heater terminal; heat conductive material and electrically conductive resistance elements substantially filling with said material the hollow space of the front part of said tip and said electrically conductive resistance elements being electrically connected between said opposite-polarity heater terminals of said tip for carrying electric heating currents and heating the forward end of said tip to solder-melting temperature; the hollow rear part of said tip being relatively free of heat conducting elements except for portions of said terminal conductor; the hollow coupling-end portion of said handle having in its interior at least two opposite-polarity contact members arranged to be connected to opposite-polarity conductors of said cord, and to engage the two opposite-polarity heater terminals of said tip and connecting them to the opposite-polarity conductors of said cord, electric supply connections to said soldering iron including a transformer arranged to be connected to a source of relatively high voltage and having secondary terminals supplied with power of relatively low voltage, said cord having two conductors connected to two of said secondary terminals, one of said two contact members of said handle being normally restrained to remain separated from the cooperating heater terminal of said soldering head and being actuable into electric contact engagement therewith; and additional contact element in said handle-coupling portion arranged to normally establish coupling engagement with the heater terminal of said tip which cooperates with said restrained contact member, said cord having an additional conductor connecting said additional contact element to one of the said secondary terminals of said transformer and arranged to supply to said heater terminals of said head limited heating current when said normally restrained contact member of said handle is separated from the cooperating heater terminal, one of the contact members in said handle coupling portion which is normally engaged by one heater terminal of said soldering head carrying a movable, thermally responsive contact element actuable to a circuit closing position and which energizes the heater elements of said soldering head in response to a predetermined drop in the temperature of said tip and to a circuit opening position in response to a predetermined rise in the temperature of said tip.

2. In a soldering iron: a generally tubular handle composed essentially of electrically-insulating material of relatively low heat conductivity; said handle having a hollow handle-coupling portion at its front end, and an electric supply conductor cord extending from its rear end; a soldering head having an electrically energizable elongated soldering tip at the front end and constituting a self-supporting unit having at its rear a coupling end arranged for detachable mechanical and electrical coupling and seating engagement within the coupling portion of said handle; said soldering tip having an exterior of highly heat conductive metal and a hollow tubular rear part; a body of electrically insulating highly heat-conductive cementitious material, and an electrically conducting resistance heater conductor shaped into a bifiliary double spiral helix of two generally parallel conductor sections embedded in said body and filling with said body the forward part of the hollow space of said soldering tip; a coupling sleeve member of electrically conducting and relatively low heat-conducting material, electrically connected to one end of said heater conductor and mechanically connected in overlapping relation to the rear end of said soldering tip and forming its mechanical coupling end and one electric terminal of said heater conductor; an elongated, relatively-rigid additional electric terminal conductor connected to the other end of said resistance conductor and held electrically insulated in the interior of said coupling sleeve and projecting from its rear end to constitute the other opposite-polarity electric terminal of said heater conductor; and at least two contact members arranged to be connected to different-polarity conductors of said cord and exposed at the coupling portion of said handle for connecting the two opposite-polarity terminals of said tip to the opposite polarity conductors of said cord.

3. In a soldering iron as claimed in claim 2, said handle and said head having interlocking elements operative to releasably lock said soldering head in its mechanically and electrically coupled position with its handle, and to permit ready removal of said head from said handle without excessive force.

4. In a soldering iron as claimed in claim 3, at least one of said interlocking elements being elastically biased to the coupling position and being actuable to an unlocking position by relative movement between said handle and said soldering head from a coupling to an uncoupling position.

5. In a soldering iron as claimed in claim 2, electric supply connections to said soldering iron including a transformer arranged to be connected to a source of relatively high voltage and supplying its secondary winding power of relatively low voltage, said cord conductors being connected to said secondary winding, one of said two contact members of said handle being normally restrained to remain separated from the cooperating heater terminal of said soldering head and being actuable into electric contact engagement therewith.

6. In a soldering iron having a handle composed essentially of electrically insulating material of relatively low heat conductivity and provided at its front end with a hollow handle coupling portion enclosing two electrically conductive coupling terminal elements constituting opposite-polarity contact members arranged to be electrically connected to opposite-polarity current-conductors of an electric supply cord extending from the rear end of the handle; a self-contained soldering head having an electrically energizable elongated soldering tip at the front end and constituting a self-supporting unit having at its rear a coupling end arranged for detachable mechanical and electrical coupling and seating engagement with the coupling portion and coupling terminal elements of said handle, said soldering tip having an exterior of heat conductive metal bounding a rearwardly extending hollow tubular tip body end portion, the rear part of said hollow tip body having one outwardly exposed tubular electrical heating terminal forming a fixed mechanical and electrical part of said tip body, said tip having also an electrical terminal conductor electrically insulated from and extending through the hollow rear part of said tip body and provided with an outwardly exposed opposite-polarity electrical terminal projecting from the rear of said tubular heating terminal, said two exposed opposite-polarity heating terminals of said tip being arranged to establish electric connections with said opposite-polarity contact members of said handle, electrically-insulating highly heat-conductive cementitious material and an electrically conducting resistance heater conductor shaped into a bifilary double spiral helix of two generally parallel conductor sections embedded in and filling with said cementitious material the forward hollow part of said tip body the parallel conductor sections of said bifilary helix forming substantially parallel coil turns confined substantially throughout their entire length to the outward region of the interior space extending adjacent the inwardly facing walls of said hollow tip body, the terminal end portions of said two sections of said heater conductor being electrically and mechanically connected to said two opposite-polarity electrical heater terminals of said tip for carrying electric heating currents and heating the forward end of said tip to solder melting temperature; the rear part of said hollow tip body being relatively free of heat conducting elements except for portions of said terminal conductor passing therethrough for suppressing flow of heat from the forward part of the tip to the hollow rear end of the tip.

7. In a soldering iron as claimed in claim 2, electric supply connections to said soldering iron including a transformer arranged to be connected to a source of relatively high voltage and having secondary terminals supplied with power of relatively low voltage, said cord having two conductors connected to two of said secondary terminals, one of said two contact members of said handle being normally restrained to remain separated from the cooperating heater terminal of said soldering head and being actuable into electric contact engagement therewith; an additional contact element in said handle-coupling portion arranged to normally establish coupling engagement with the heater terminal of said tip which cooperates with said restrained contact member, said cord having an additional conductor connecting said additional contact element to one of the secondary terminals of said transformer and arranged to supply to said heater terminals of said head limited heating current when said normally restrained contact member of said handle is separated from the cooperating heater terminal.

8. In a soldering iron as claimed in claim 2, one of the contact members in said handle coupling portion which is normally engaged by one heater terminal of said soldering head carrying a movable, thermally responsive contact element actuable to a circuit closing position and which energizes the heater elements of said soldering head in response to a pre-determined drop in the temperature of said tip and to a circuit opening position in response to a predetermined rise in the temperature of said tip.

9. In a soldering iron as claimed in claim 8, said thermally responsive contact element being constructed to abruptly open said circuit in response to a predetermined rise in its temperature.

10. In a soldering iron as claimed in claim 6, electric supply connections to said soldering iron including a transformer arranged to be connected to a source of relatively high voltage and having secondary terminals supplied with power of relatively low voltage, said cord having two conductors connected to two of said secondary terminals, one of said two contact members of said handle being normally restrained to remain separated from the cooperating heater terminal of said soldering head and being actuable into electric contact engagement therewith.

11. In a soldering iron as claimed in claim 10, an additional contact element in said handle-coupling portion arranged to normal establish coupling engagement with the heater terminal of said tip which cooperates with said restrained contact member, said cord having an additional conductor connecting said additional contact element to one of the said secondary terminals of said transformer and arranged to supply to said heater terminals of said head limited heating current when said normally restrained contact member of said handle is separated from the cooperating heater terminal.

12. In a soldering iron: a soldering head having at the forward end an electrically energizable soldering tip comprising an elongated hollow tip body having thin side walls of heat conductive metal bounding an elongated hollow tip space, electrically-insulating highly heat-conductive cementitious material and an electrically conducting resistance heater conductor shaped into a bifilary spiral helix of two generally parallel conductor sections embedded in and filling with said cementitious material the forward part of said hollow tip space, the two parallel conductor sections of said bifilary helix forming substantially parallel coil turns confined substantially throughout their entire length to the outward region of said hollow space extending adjacent the inwardly facing side walls of said tip body, said two conductor sections of said heater conductor having two rearwardly extending opposite-polarity terminal portions for supplying electric heating current to said helix and heating the forward end of said tip to solder melting temperature, the rear part of said hollow tip space being relatively free of heat conducting elements except for said terminal portions of said conductor sections passing therethrough for suppressing flow of heat from the forward part of the tip through the hollow rear part of the tip, said soldering head having at its rear, terminal elements arranged for detachable mechanical and electrical coupling to a separate handle structure.

13. In a soldering iron as claimed in claim 12, the rear part of said tip body being provided with one outwardly exposed tubular electrical heater terminal forming a fixed mechanical and electrical part of said tip and arranged to constitute with said tip a self-supporting detachable soldering head, the rear part of said tip having also an electrical terminal conductor electrically insulated from and extending through the hollow rear part of said tip and having an outwardly exposed other electrical heater terminal of opposite-polarity projecting from the rear of said one heater terminal, the opposite-polarity terminal end portions of said two conductor sections being electrically connected between said opposite-polarity heater terminals of said tip.

EMIL H. GREIBACH.

REFERENCES CITED

The following references are of record in the file of this patent:

UNITED STATES PATENTS

| Number | Name | Date |
| --- | --- | --- |
| 455,010 | Appleyard | June 30, 1891 |
| 594,872 | Harriman | Dec. 7, 1897 |
| 669,130 | Vogt | Mar. 5, 1901 |
| 908,712 | Van Dolsen | Jan. 5, 1909 |
| 1,442,648 | Carter | Jan. 16, 1923 |
| 1,478,319 | Young | Dec. 18, 1923 |
| 1,684,143 | Pieper et al. | Sept. 11, 1928 |
| 1,714,615 | Naumann et al. | May 28, 1929 |
| 1,971,577 | Parker | Aug. 28, 1934 |
| 2,009,980 | Abbott | July 30, 1935 |
| 2,102,032 | Richardson | Dec. 14, 1937 |
| 2,198,877 | Kuhn et al. | Apr. 30, 1940 |
| 2,248,248 | Nye et al. | July 8, 1941 |
| 2,413,125 | Walbridge | Dec. 24, 1946 |
| 2,494,840 | Stephenson | Jan. 17, 1950 |
| 2,552,193 | Lennox | May 8, 1951 |
| 2,552,253 | Brown | May 8, 1951 |

FOREIGN PATENTS

| Number | Country | Date |
| --- | --- | --- |
| 70,928 | Norway | Sept. 2, 1946 |
| 247,487 | Switzerland | Dec. 1, 1947 |
| 509,599 | Great Britain | July 13, 1939 |
| 558,366 | Great Britain | June 3, 1944 |